United States Patent
Li et al.

(10) Patent No.: US 12,085,777 B2
(45) Date of Patent: Sep. 10, 2024

(54) ZOOM ASSEMBLY, LENS MODULE, AND ELECTRONIC DEVICE

(71) Applicant: Huawei Technologies Co., Ltd., Shenzhen (CN)

(72) Inventors: Ming Li, Wuhan (CN); Jianmin Gong, Shenzhen (CN); Dongyu Geng, Shenzhen (CN); Francis Man, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 627 days.

(21) Appl. No.: 17/398,468

(22) Filed: Aug. 10, 2021

(65) Prior Publication Data

US 2021/0364728 A1 Nov. 25, 2021

Related U.S. Application Data

(63) Continuation of application No. PCT/CN2020/074235, filed on Feb. 3, 2020.

(30) Foreign Application Priority Data

Feb. 11, 2019 (CN) .......................... 201910110191.X

(51) Int. Cl.
*G02B 7/04* (2021.01)
*G02B 13/00* (2006.01)
*G02B 17/08* (2006.01)
*G03B 17/17* (2021.01)

(52) U.S. Cl.
CPC ........... *G02B 7/04* (2013.01); *G02B 13/0065* (2013.01); *G02B 17/08* (2013.01); *G03B 17/17* (2013.01)

(58) Field of Classification Search
CPC ...... G02B 7/04; G02B 13/0065; G02B 17/08; G02B 15/14; G02B 17/0896; G02B 26/00; G02B 26/02; G02B 26/004; G03B 17/17; G03B 2205/0007; G03B 2205/0046; G03B 3/10; G03B 5/00
See application file for complete search history.

(56) References Cited

U.S. PATENT DOCUMENTS

| 2002/0101646 | A1 | 8/2002 | Ide et al. | |
|---|---|---|---|---|
| 2015/0286033 | A1* | 10/2015 | Osborne | .................. G03B 3/10 348/345 |
| 2016/0363745 | A1 | 12/2016 | Kubota | |

FOREIGN PATENT DOCUMENTS

| CN | 1648710 A | 8/2005 |
|---|---|---|
| CN | 1769942 A | 5/2006 |
| CN | 1844997 A | 10/2006 |

(Continued)

*Primary Examiner* — James C. Jones
(74) *Attorney, Agent, or Firm* — Slater Matsil, LLP

(57) ABSTRACT

This application provides a zoom assembly, including a first refraction component and a first lens apparatus. The first refraction component is configured to change a transmission path of light, and the first refraction component includes a first surface, a second surface, a third surface, and a first reflection structure. The three surfaces of the first refraction component are all transmission surfaces. An optical axis of the first lens apparatus is perpendicular to the second surface of the first refraction component. The first reflection structure is attached to the third surface, and is configured to receive light transmitted by one of the transmission surfaces and reflect the light to another transmission surface.

20 Claims, 10 Drawing Sheets

(56) References Cited

FOREIGN PATENT DOCUMENTS

| | | | |
|---|---|---|---|
| CN | 1940630 | A | 4/2007 |
| CN | 101257576 | A | 9/2008 |
| CN | 102549472 | A | 7/2012 |
| CN | 206115002 | U | 4/2017 |
| CN | 107490845 | A | 12/2017 |
| CN | 207127391 | U | 3/2018 |
| CN | 108732728 | A | 11/2018 |
| JP | 2018120149 | A | 8/2018 |
| WO | 2018008833 | A2 | 1/2018 |

* cited by examiner

ZOOM ASSEMBLY, LENS MODULE, AND ELECTRONIC DEVICE

CROSS-REFERENCE TO RELATED APPLICATIONS

This application is a continuation of International Application No. PCT/CN2020/074235, filed on Feb. 3, 2020, which claims priority to Chinese Patent Application No. 201910110191.X, filed on Feb. 11, 2019. The disclosures of the aforementioned applications are hereby incorporated by reference in their entireties.

TECHNICAL FIELD

This application relates to the technical field of optical devices, and in particular to a zoom assembly, a lens module, and an electronic device.

BACKGROUND

With the development of multimedia technologies, digital cameras have been widely used by people and have a large market demand. In recent years, the function of digital camera in mobile phones has become one of the most concerned indicators of consumers. Digital cameras usually have two zoom modes: digital zoom and optical zoom. In an existing mobile phone product, zooming is mainly performed in the digital zoom mode, that is, by changing a size of an imaging plane, or capturing an image of a different imaging plane size, an image size of a photo is changed. In this way, definition of an image is affected, and image quality of an obtained image is affected. The optical zoom changes a focal length of a zoom lens module by changing relative positions of lenses in the lens module. Because an image is obtained by optical zoom through a real optical structure, the image is clearer and image quality is ensured. However, generally, the optical zoom requires certain space for expansion and contraction, which causes a relatively large space occupied by the lens module.

SUMMARY

A technical problem to be solved by embodiments of this application is to provide a zoom assembly, a lens module, and an electronic device that reduces space occupied.

To achieve the foregoing object, the following technical solutions are used in implementations of this application.

According to a first aspect, an embodiment of this application provides a zoom assembly, where the zoom assembly includes a first refraction component and a first lens apparatus, the first refraction component is configured to change a transmission path of light, the first refraction component includes a first surface, a second surface, a third surface, and a first reflection structure; the first surface, the second surface, and the third surface of the first refraction component are all transmission surfaces, and the first reflection structure is attached to the third surface, and is configured to receive light transmitted by one of the transmission surfaces and reflect the light to another transmission surface; and the first refraction component meets one or more of the following conditions: the first surface is attached to a focus adjustment lens, the second surface is attached to the focus adjustment lens, and the first reflection structure includes a focus adjustment lens and a reflection layer attached to a side that is of the focus adjustment lens and that is away from the third surface.

According to a second aspect, an embodiment of this application provides a lens module, where the lens module includes the foregoing zoom assembly and a fixed-focus lens assembly, the zoom assembly is configured to receive light from the fixed-focus lens assembly, or the zoom assembly is configured to transmit light to the fixed-focus lens assembly.

According to a third aspect, an embodiment of this application further provides an electronic device, where the electronic device includes the foregoing lens module, a controller, and an adjustment unit, the controller is electrically connected to the adjustment unit, the adjustment unit is connected to a focus adjustment lens of the lens module, and the controller is configured to control the adjustment unit to adjust a curvature of the focus adjustment lens, to implement zooming of the lens module.

DETAILED DESCRIPTION OF ILLUSTRATIVE EMBODIMENTS

First Implementation

Figure 1:
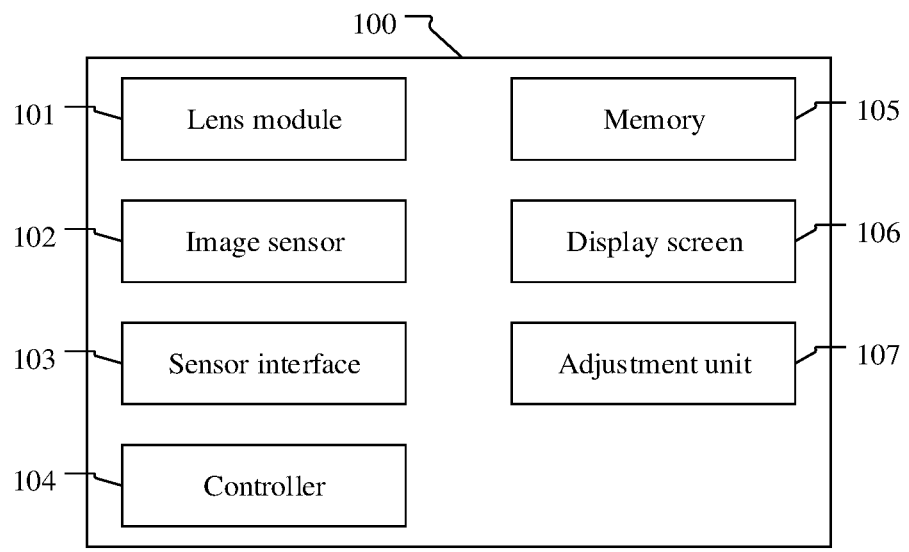
FIG. 1 is a structural block diagram of an electronic device provided in a first implementation of this application.

Referring to FIG. 1, FIG. 1 is a structural block diagram of an electronic device provided in a first implementation of this application. The electronic device 100 may be a device that collects light reflected from an external photographed object to take a photo or video. For example, the electronic device 100 may be a mobile phone, a tablet computer, a dashcam, or a camera.

The electronic device 100 may include a lens module 101, an image sensor 102, a sensor interface 103, a controller 104, a memory 105, a display screen 106, and an adjustment unit 107.

The lens module 101 may collect light that arrives at the electronic device boo from a photographed object. The light collected by the lens module 101 forms an image on the image sensor 102.

The image sensor 102 is configured to receive light from the lens module 101 and generate an image. More specifically, the image sensor 102 may convert light into an electronic image signal by using a photoelectric conversion effect. The image may be communicated to the controller 104 through the sensor interface 103. The image sensor 102 may include a set of pixels in a two-dimensional arrangement and may convert light into electronic image data at each pixel. In various embodiments, the image sensor 102 may further include a mechanical structure that acts as an aperture for adjusting the amount of light before incident light arrives at the image sensor 102. The image sensor 102 may read the electronic image data recorded at each pixel based on the photoelectric conversion effect.

The sensor interface 103 may perform interface connection between the image sensor 102 and the controller 104.

Based on various processing operations, the controller 104 may output the image data collected in the image sensor 102 on the display screen 106 or may store the collected image data in the memory 105. The controller 104 may include one or more processors.

The memory 105 may store a current image, information for controlling the electronic device wo, and the like.

The display screen 106 may output image data processed in the controller 104.

The adjustment unit 107 is electrically connected to the controller 104, and the adjustment unit 107 is configured to adjust a focal length of the lens module 101 under control of the controller 104, to perform zooming.

Figure 2:
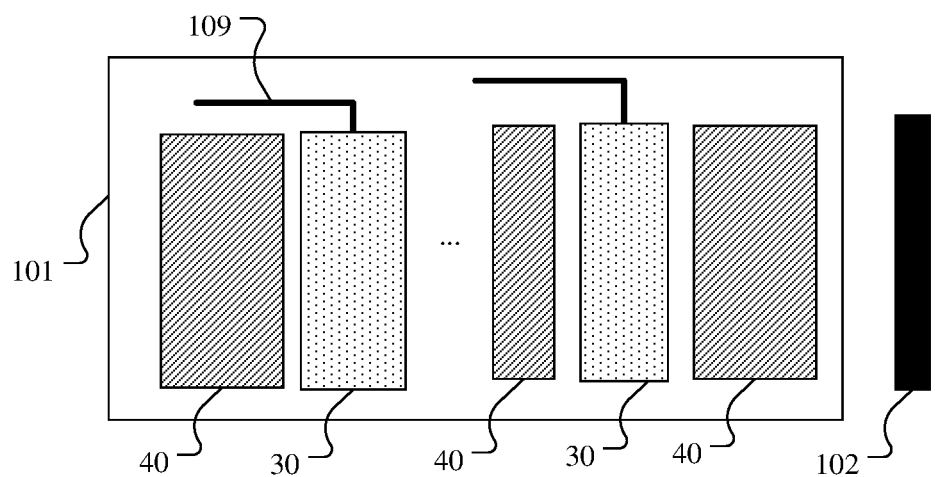
FIG. 2 is a schematic structural diagram of a lens module and an image sensor provided in the first implementation of this application.

Referring to FIG. 2, FIG. 2 is a schematic structural diagram of a lens module and an image sensor provided in the first implementation of this application. Specifically, the lens module 101 includes a zoom assembly 30 and a fixed-focus lens assembly 40 arranged in sequence. In this implementation, the lens module 101 is a 1-2× zoom lens module. There are a plurality of zoom assemblies 30 illustrated in FIG. 2, and there are a plurality of fixed-focus lens assemblies 40 illustrated in FIG. 2. A zoom assembly 30 is disposed between every two adjacent fixed-focus lens assemblies 10, and a fixed-focus lens assembly 40 is disposed between every two adjacent zoom assemblies 30. Light passes through each assembly in the lens module 101 and finally arrives at the image sensor 102, thereby obtaining a photographed image.

The zoom assembly 30 is connected to the adjustment unit 107 by using a control lead 109. The controller 104 is configured to control the adjustment unit 107 to adjust a focal length of the zoom assembly 30 to implement zooming. In this implementation, the adjustment unit 107 is a micro electro mechanical system (MEMS), which can improve a zoom speed of the zoom assembly 30 and reduce power consumption, and can reduce space occupied by the lens module 101.

The fixed-focus lens assembly 40 is a conventional lens group whose focal length cannot be changed and is mainly used for chromatic aberration correction and aberration correction.

It can be understood that the fixed-focus lens assembly 40 may be omitted, the number of zoom assembly(ies) 30 may be one, and the fixed-focus lens assembly 40 and the zoom assembly 30 may be arranged as required.

Figure 3:
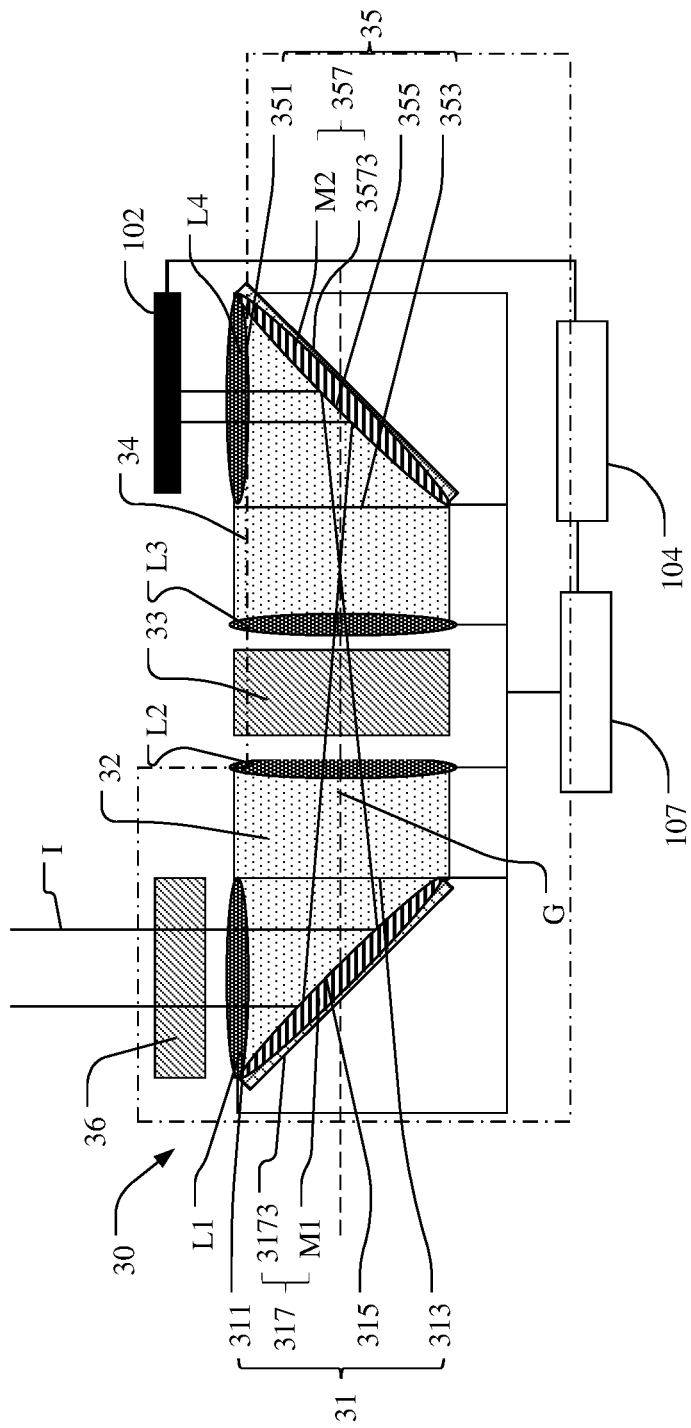
FIG. 3 is a schematic structural diagram of a zoom assembly provided in the first implementation of this application.

Referring to FIG. 3, FIG. 3 is a schematic structural diagram of a zoom assembly provided in the first implementation of this application. The zoom assembly 30 includes a first refraction component 31, a first transparent component 32, a first lens apparatus 33, a second transparent component 34, and a second refraction component 35 that are arranged in sequence.

The first refraction component 31 is configured to deflect light entering the first refraction component 31, that is, change a transmission path of the light. The first refraction component 31 includes a first surface 311, a second surface 313, a third surface 315, and a first reflection structure 317. One end of the third surface 315 of the first refraction component 31 is connected to the first surface 311 of the first refraction component 31, and the other end of the third surface 315 of the first refraction component 31 is connected to the second surface 313 of the first refraction component 31. The first surface 311, the second surface 313, and the third surface 315 are all transmission surfaces. The first reflection structure 317 is attached to the third surface 315, and is configured to receive light transmitted from the first surface 311 and reflect the light to the second surface 313 for exiting.

The first transparent component 32 is attached to the second surface 313 of the first refraction component 31, for transmitting light.

The first lens apparatus 33 is configured to perform imaging. The first lens apparatus 33 is located between the first transparent component 32 and the second transparent component 34. The first lens apparatus 33 has an optical axis G, and the optical axis G is a symmetry axis of an optical system of the first lens apparatus 33. The optical axis G is approximately perpendicular to the second surface 313 of the first refraction component 31. It should be understood that a manufacturing error exists. For example, an included angle between the optical axis G and the second surface 313 of the first refraction component 31 is 85 degrees or 88 degrees, and this also falls within the protection scope of this application. The first refraction component 31, the first transparent component 32, the second transparent component 34, and the second refraction component 35 are disposed along the optical axis G of the first lens apparatus 33. The first lens apparatus 33 is disposed opposite the second surface 313. It can be understood that the first lens apparatus 33 may include one lens, or may include a plurality of lenses. A side that is of the second transparent component 34 and that is away from the first lens apparatus 33 is attached to the second refraction component 35.

Similar to the first refraction component 31, the second refraction component 35 includes a first surface 351, a second surface 353, a third surface 355, and a reflection structure 357. One end of the third surface 355 of the second refraction component 35 is connected to the first surface 351 of the second refraction component 35, and the other end of the third surface 355 of the second refraction component 35 is connected to the second surface 353 of the second refraction component 35. The second surface 353 of the second refraction component 35 is attached to a side that is of the second transparent component 34 and that is away from the first lens apparatus 33. The optical axis G is substantially perpendicular to the second surface 353 of the second refraction component 35, and a manufacturing error is allowed. The first surface 351, the second surface 353, and the third surface 355 are all transmission surfaces. The second reflection structure 357 is attached to the third surface 355 to receive light transmitted from the first surface 351 and reflect the light to the second surface 353 for exiting.

A first focus adjustment lens L1 is disposed on the first surface 311 of the first refraction component 31, a first focus adjustment lens L2 is disposed on a side that is of the first transparent component 32 and that is adjacent to the first lens apparatus 33, a first focus adjustment lens L3 is disposed on a side that is of the second transparent component 34 and that is adjacent to the first lens apparatus 33, and a first focus adjustment lens L4 is disposed on the first surface 351 of the second refraction component 35. The first reflection structure 317 includes a second focus adjustment lens M1 and a reflection layer 3173 disposed on a side that is of the second focus adjustment lens M1 and that is away from the third surface 315. The second reflection structure 357 includes a second focus adjustment lens M2 and a reflection layer 3573 that is disposed on the second focus adjustment lens M2 and that is away from the third surface 355. The focus adjustment lenses (for example, the first focus adjustment lenses L1-L4 and the second focus adjustment lenses M1-M2) are all lenses with adjustable curvatures. Zooming can be implemented by changing a curvature of at least one of the first focus adjustment lenses L1-L4 and the second focus adjustment lenses M1-M2. It should be understood that the first refraction component and the second refraction component may be triangular prisms, or may be prisms of other shapes.

In this implementation, the focus adjustment lenses (L1-L4 and M1-M2) are disposed on the zoom assembly 30 in an attaching manner. More specifically, the first focus adjustment lens L1 is attached to the first surface 311 of the first refraction component 31, and the first focus adjustment lens L4 is attached to the first surface 351 of the second refraction component 35. The first focus adjustment lens L2 is attached to a surface of a side that is of the first transparent component 32 and that is adjacent to the first lens apparatus 33, and the first focus adjustment lens L3 is attached to a surface of a side that is of the second transparent component 34 and that is adjacent to the first lens apparatus 33. In this way, previously idle surfaces of the first refraction component 31, the second refraction component 35, the first transparent component 32, and the second transparent component 34 are used to be attached to first focus adjustment lenses, to improve zoom performance of the zoom assembly 30 and make a structure of the zoom assembly 30 compact, that is, space occupied by the zoom assembly 30 can be effectively reduced. Further, the second focus adjustment lens M1 of the reflection layer 3173 is attached to the third surface 315 of the first refraction component 31, and the second focus adjustment lens M2 of the reflection layer 3573 is attached to the third surface 355 of the second refraction component 35, so that the zoom performance of the zoom assembly 30 is further improved, the structure of the zoom assembly 30 is further compacted, and space occupied by the zoom assembly 30 is reduced. In this implementation, the first refraction component 31 deflects light by approximately 90 degrees by using the second focus adjustment lens M1, and the second refraction component 35 deflects light by approximately 90 degrees by using the second focus adjustment lens M2.

In an implementation, the focus adjustment lens may be made of a transparent piezoelectric material, the adjustment unit is an electrode (for example, a transparent electrode) electrically connected to the focus adjustment lens, and a voltage is applied by using the electrode, so that the piezoelectric material in the focus adjustment lens deforms under a piezoelectric effect, therefore, a curvature radius of the focus adjustment lens is changed, and the curvature radius of the focus adjustment lens may be changed by adjusting a magnitude and a direction of a voltage, thereby changing a focal length of the zoom assembly.

In an implementation, the focus adjustment lens may be a soft film or a liquid lens. An acting force is applied to the focus adjustment lens through the adjustment unit, and the focus adjustment lens is deformed due to the force, thereby causing a change in the curvature radius of the focus adjustment lens. The curvature radius of the focus adjustment lens is changed by adjusting a magnitude and a direction of an acting force applied, to change a focal length of the focus adjustment lens.

In an implementation, the focus adjustment lens may be a liquid lens, the focus adjustment lens has a sealed cavity containing liquid, liquid in the sealed cavity is extracted or injected by using the adjustment unit to implement a change in the curvature radius of the focus adjustment lens, and the curvature radius of the focus adjustment lens is changed by adjusting an amount of liquid extracted or injected, to change a focal length of the focus adjustment lens. It can be understood that the curvature of the focus adjustment lens may be adjusted in another manner, which is not limited herein.

It can be understood that, in other implementations, curved surface processing may be directly performed on an optical element to form a focus adjustment lens with adjustable curvature. For example, processing may be performed on a surface of the prism to form a lens with adjustable curvature.

In this implementation, the image sensor 102 is placed in a first direction (for example, a horizontal direction shown in FIG. 3). Light I is incident from the first focus adjustment lens L1 of the first refraction component 31, passes through the first transparent component 32, the first lens apparatus 33, and the second transparent component 34, exits from the first focus adjustment lens L4 on the second refraction component 35, and arrives at the image sensor 102. An end on which the first refraction component 31 is located in the zoom assembly 30 is taken as an incident end of the zoom assembly 30, and an end on which the second refraction component 35 is located in the zoom assembly 30 is taken as an exit end of the zoom assembly 30. A zoom function may be obtained by performing combined adjustment on the first focus adjustment lenses L1-L4 and the second focus adjustment lenses M1-M2.

For example, the controller 104 controls the adjustment unit 107 to deform the first focus adjustment lens L1 and the first focus adjustment lens L2 to form a concave, and deform the second focus adjustment lens M1 to form a bulge, so that a focal length of a lens at the incident end becomes longer. Moreover, the controller 104 controls the adjustment unit 107 to deform the first focus adjustment lens L3 and the first focus adjustment lens L4 to form a bulge, and deform the second focus adjustment lens M2 to form a concave, so that a focal length of a lens at the exit end becomes shorter. Therefore, a near-focus/wide-angle image may be obtained, in this way, a wide-angle mode of the lens module 101 is implemented.

For another example, the controller 104 controls the adjustment unit 107 to deform the first focus adjustment lens L1 and the first focus adjustment lens L2 to form a bulge, and deform the second focus adjustment lens M1 to form a concave, so that a focal length of a lens at the incident end becomes shorter. Moreover, the controller 104 controls the adjustment unit 107 to deform the first focus adjustment lens L3 and the first focus adjustment lens L4 to form a concave, and deform the second focus adjustment lens M2 to form a bulge, so that a focal length of a lens at the exit end becomes longer to obtain a long-focus image, in this way, a long-focus mode of the lens module 101 is implemented.

The zoom assembly 30 further includes a second lens apparatus 36. The second lens apparatus 36 is disposed adjacent to the first refraction component 31 and is aligned with the first focus adjustment lens L1 on the first surface 311 of the first refraction component 31, that is, light is incident to the first refraction component 31 through the second lens apparatus 36. It can be understood that there may be one or more lenses in the second lens apparatus 36.

With respect to the zoom assembly 30 provided in this implementation, the focus adjustment lenses are disposed on surfaces of the first refraction component 31, the first transparent component 32, the second transparent component 34, and the second refraction component 35, which can effectively use space, is conductive to the compact structure of the zoom assembly 30, and can increase the number of focus adjustment lenses in limited space to obtain a relatively wide adjustment range, thus improving the zoom performance of the zoom assembly 30. In addition, because focus adjustment is performed in an optical focus adjustment manner, image quality is ensured.

Second Implementation

Figure 4:
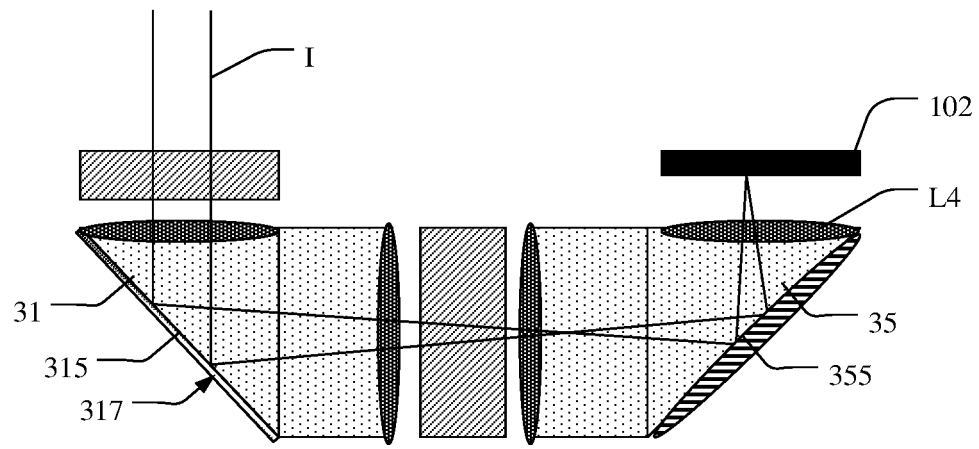
FIG. 4 is a schematic structural diagram of a zoom assembly and an image sensor provided in a second implementation of this application.

Referring to FIG. 4, FIG. 4 is a schematic structural diagram of a zoom assembly and an image sensor provided in a second implementation of this application. The image sensor 102 is disposed in alignment with the first focus adjustment lens L4 on the second refraction component 35, and the first reflection structure 317 on the third surface 315 of the first refraction component 31 is a planar mirror. Alternatively, the first reflection structure 317 of the first refraction component 31 is a mirror with a fixed curvature. In an implementation, the second reflection structure 357 on the third surface 355 of the second refraction component 35 is a mirror with a fixed curvature. In an implementation, the second reflection structure 357 on the third surface 355 of the second refraction component 35 is a planar mirror.

Third Implementation

Figure 5:
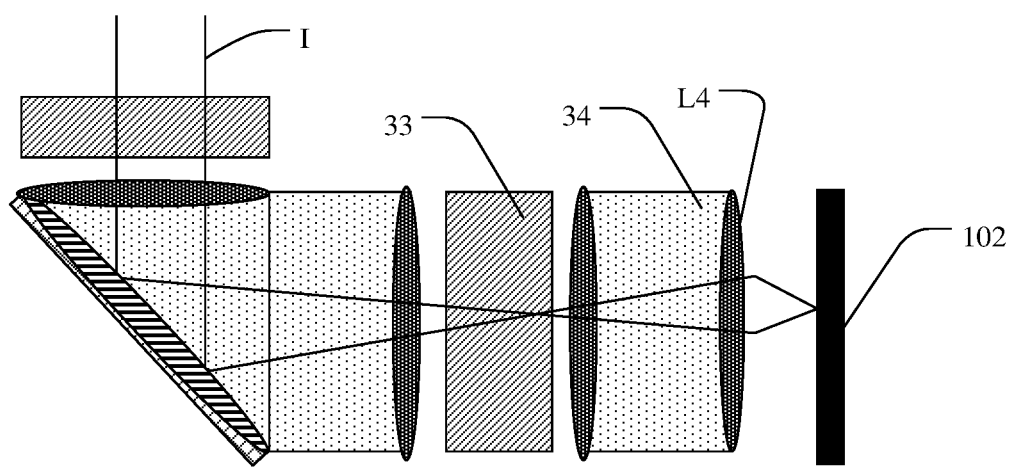
FIG. 5 is a schematic structural diagram of a zoom assembly and an image sensor provided in a third implementation of this application.

Referring to FIG. 5, FIG. 5 is a schematic structural diagram of a zoom assembly and an image sensor provided in a third implementation of this application. The second refraction component 35 may be omitted, the second transparent component 34 is disposed between the first lens apparatus 33 and the image sensor 102, the first focus adjustment lens L4 is disposed on a side that is of the second transparent component 34 and that is away from the first lens apparatus 33, the image sensor 102 is disposed in a second direction (for example, a vertical direction shown in FIG. 5) different from the first direction, and light I directly exits from the first focus adjustment lens L4 on the second transparent component 34 to arrive at the image sensor 102.

Fourth Implementation

Figure 6:
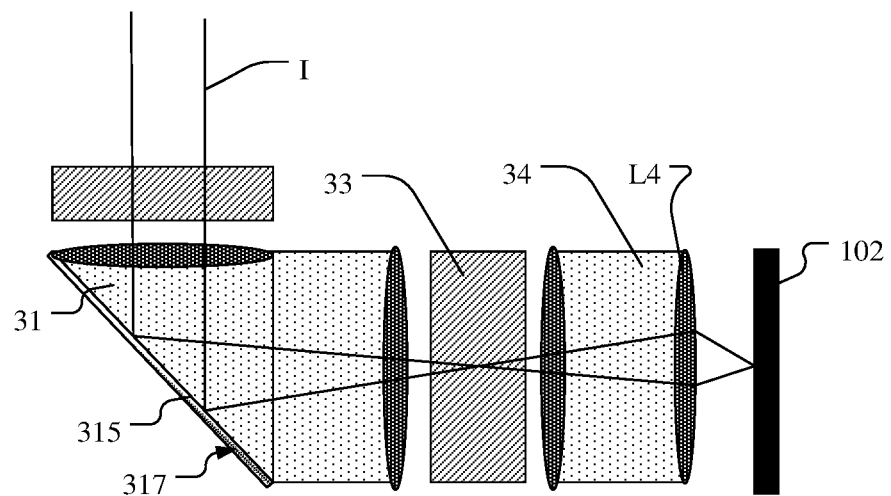
FIG. 6 is a schematic structural diagram of a zoom assembly and an image sensor provided in a fourth implementation of this application.

Referring to FIG. 6, FIG. 6 is a schematic structural diagram of a zoom assembly and an image sensor provided in a fourth implementation of this application. The first reflection structure 317 on the third surface 315 of the first refraction component 31 is a planar mirror, the second refraction component 35 may be omitted, the second transparent component 34 is disposed between the first lens apparatus 33 and the image sensor 102, the first focus adjustment lens L4 is disposed on a side that is of the second transparent component 34 and is away from the first lens apparatus 33, the image sensor 102 is disposed in a second direction (for example, a vertical direction shown in FIG. 6) different from the first direction, and the light I exits from the first focus adjustment lens L4 on the second transparent component 34 to the image sensor 102.

Fifth Implementation

Figure 7:
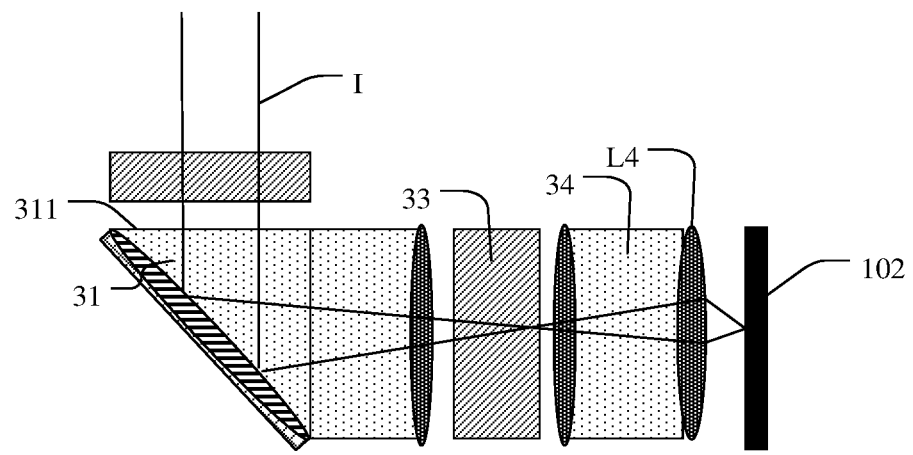
FIG. 7 is a schematic structural diagram of a zoom assembly and an image sensor provided in a fifth implementation of this application.

Referring to FIG. 7, FIG. 7 is a schematic structural diagram of a zoom assembly and an image sensor provided in a fifth implementation of this application. The first focus adjustment lens L1 on the first surface 311 of the first refraction component 31 may be omitted, the second refraction component 35 may be omitted, the second transparent component 34 is disposed between the first lens apparatus 33 and the image sensor 102, the first focus adjustment lens L4 is disposed on a side that is of the second transparent component 34 and that is away from the first lens apparatus 33, the image sensor 102 is disposed in a second direction (for example, a vertical direction shown in FIG. 7) different from the first direction, and the light exits from the first focus adjustment lens L4 on the second transparent component 34 to the image sensor 102.

Sixth Implementation

Figure 8:
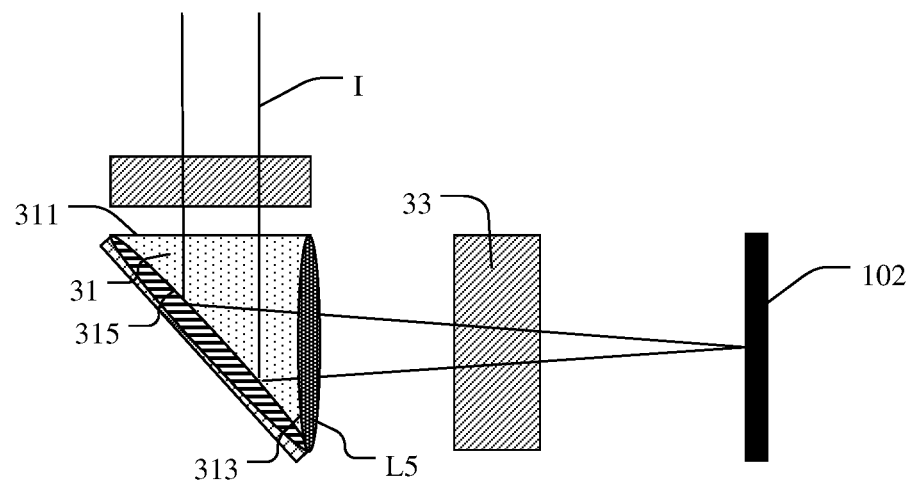
FIG. 8 is a schematic structural diagram of a zoom assembly and an image sensor provided in a sixth implementation of this application.

Referring to FIG. 8, FIG. 8 is a schematic structural diagram of a zoom assembly provided in a sixth implementation of this application. The first transparent component 32 and the second transparent component 34 may be omitted, and a focus adjustment lens L5 may be disposed on the second surface 313 of the first refraction component 31. In another implementation, at least one of the first surface 311, the second surface 313, and the third surface 315 of the first refraction component 31 is attached to a focus adjustment lens.

A focus adjustment lens is installed on an idle surface of the prism, that is, three surfaces of the prism are effectively used, so that other space is not required for placing components and supports, and a volume is compressed to the maximum extent. In addition, because there are many interfaces, a plurality of focus adjustment lenses may be placed compactly, to obtain a relatively wide adjustment range. Further, because a variable-curvature lens is used in a focus adjustment technology, instead of a mechanical motor is used to adjust a lens position, a fast focus adjustment capability is obtained.

Seventh Implementation

Figure 9:
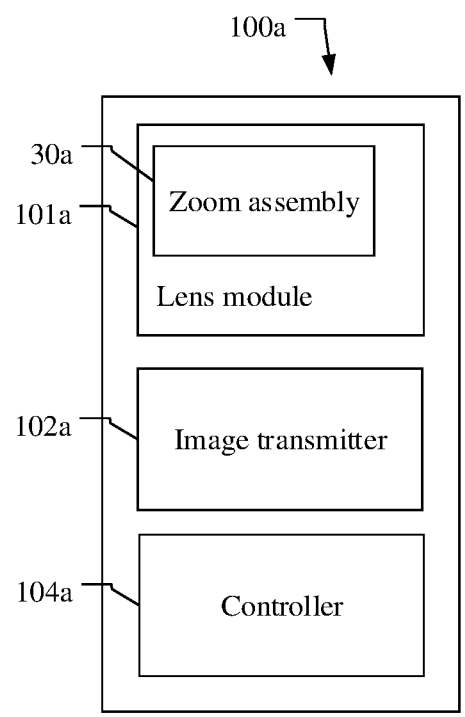
FIG. 9 is a structural block diagram of an electronic device provided in a seventh implementation of this application.

Referring to FIG. 9, FIG. 9 is a structural block diagram of an electronic device provided in a seventh implementation of this application. The electronic device bow is a projection device. The electronic device bow includes a lens module 102a, an image transmitter 102a, and a controller 104a. The image transmitter 102a is electrically connected to the controller 104a, and is configured to output light to the lens module 102a, to output an image for projection display. The lens module 102a includes a zoom assembly 30a.

Figure 10:
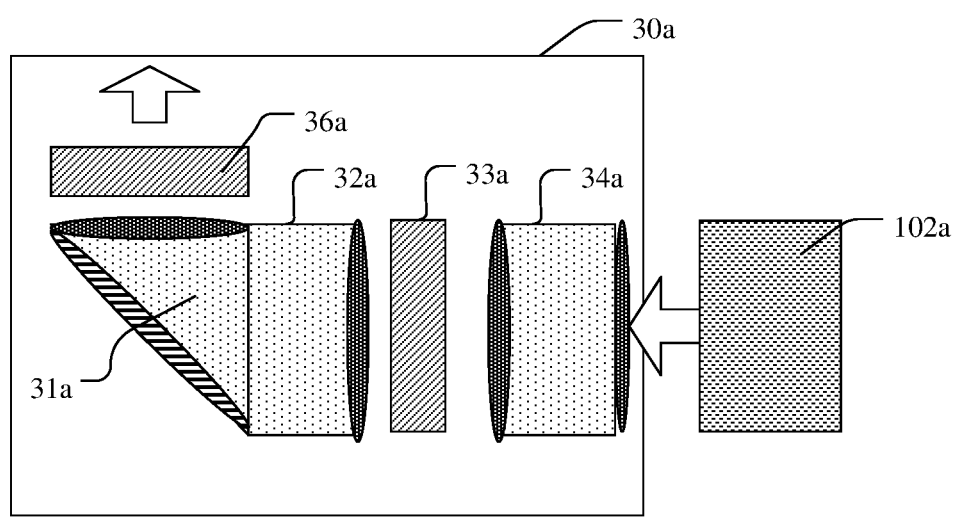
FIG. 10 is a schematic structural diagram of a zoom assembly and an image transmitter provided in the seventh implementation of this application.

Referring to FIG. 10, FIG. 10 is a schematic structural diagram of a zoom assembly and an image transmitter provided in the seventh implementation of this application. A structure of the zoom assembly 30a is approximately the same as that of the zoom assembly 30 provided in the first implementation. A difference lies in that a second refraction component is omitted in the zoom assembly 30a. The zoom assembly 30a includes a first refraction component 31a, a first transparent component 32a, a first lens apparatus 33a, a second transparent component 34a, and a second lens apparatus 36a. Light output by the image transmitter 102a passes through the second transparent component 34a, the first lens apparatus 33a, the first transparent component 32a, and the first refraction component 31a, and exits from the second lens apparatus 36a for projection display.

In an implementation, the image transmitter may be alternatively replaced with an infrared sensor, configured to receive infrared ray, that is, the electronic device may be an infrared device, to improve infrared light receiving quality.

Eighth Implementation

Figure 11:
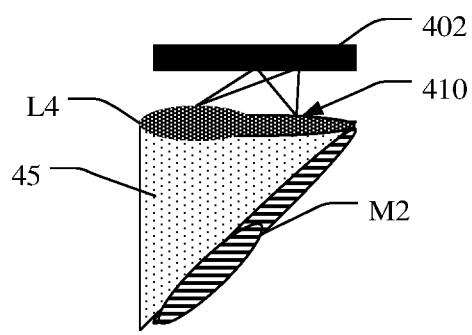
FIG. 11 is a schematic structural diagram of an image sensor and a part of a zoom assembly provided in an eighth implementation of this application.

A structure of the zoom assembly provided in the eighth implementation of this application is similar to that of the zoom assembly provided in the first implementation. A difference lies in that at least one of the plurality of focus adjustment lenses is a press-type focus adjustment lens. For example, referring to FIG. 11, FIG. 11 is a schematic diagram of an image sensor and a partial structure of the zoom assembly provided in the eighth implementation of this application. The first focus adjustment lens L4 and the second focus adjustment lens M2 on the second refraction component 45 are press-type focus adjustment lenses.

Figure 12:
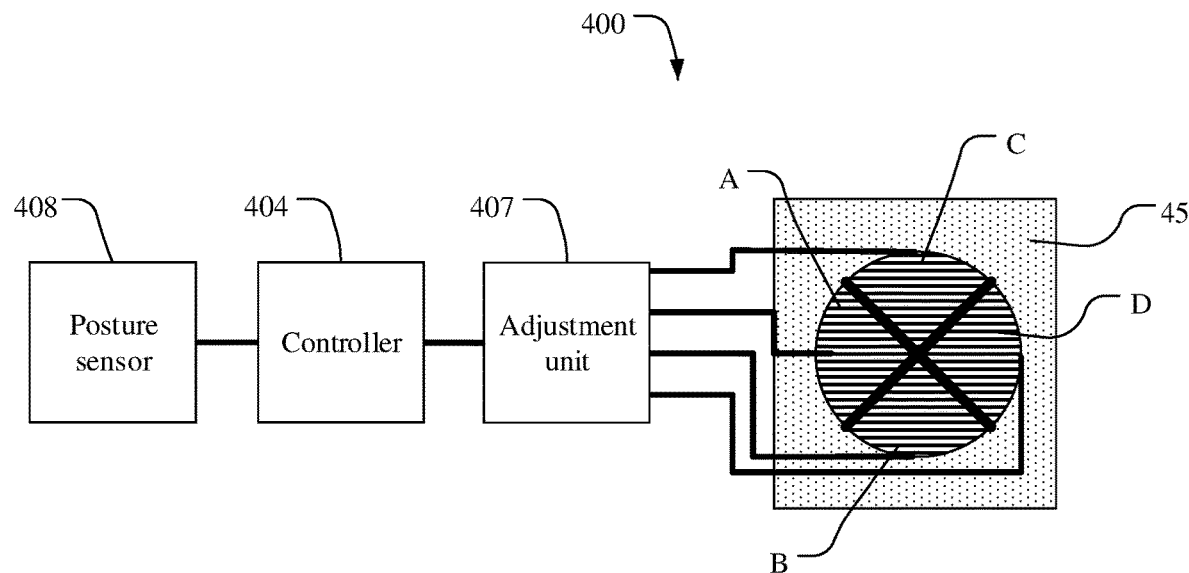
FIG. 12 is a partial structural diagram of an electronic device provided in the eighth implementation of this application.

Referring to FIG. 12, FIG. 12 is a partial structural diagram of an electronic device provided in an eighth implementation of this application. The press-type focus adjustment lens includes a plurality of pressing areas. In this implementation, the plurality of pressing areas include a pressing area A, a pressing area B, a pressing area C, and a pressing area D. A surface (for example, the surface is a soft film) or a boundary (for example, a soft film boundary) of the press-type focus adjustment lens is asymmetrically driven, so that a curved surface center of the press-type focus adjustment lens is moved, thereby changing a location of an imaging point (for example, an imaging point location on an image sensor).

The electronic device 400 includes a controller 404, an adjustment unit 407, and a posture sensor 408. The posture sensor 408 is configured to obtain shake information (for example, posture and acceleration information) of the electronic device 400 and transmit the shake information to the controller 404. The controller 404 processes and analyzes the shake information and outputs a corresponding compensation signal. The adjustment unit 407 applies, based on the compensation signal, an acting force to the pressing area A, the pressing area B, the pressing area C, and the pressing area D, to perform asymmetric pressing, so that the press-type focus adjustment lens is deformed to form an asymmetric curved surface structure (for example, a curved surface structure 410 shown in FIG. 10), and a coordinate position of an imaging point on the image sensor is adjusted, to compensate for imaging distortion, and implement an image stabilization function.

It can be understood that there may be one, two, three, or more pressing areas. The pressing area(s) is(are) pressed to deform the press-type focus adjustment lens to form an asymmetric curved surface structure.

Ninth Implementation

Figure 13:
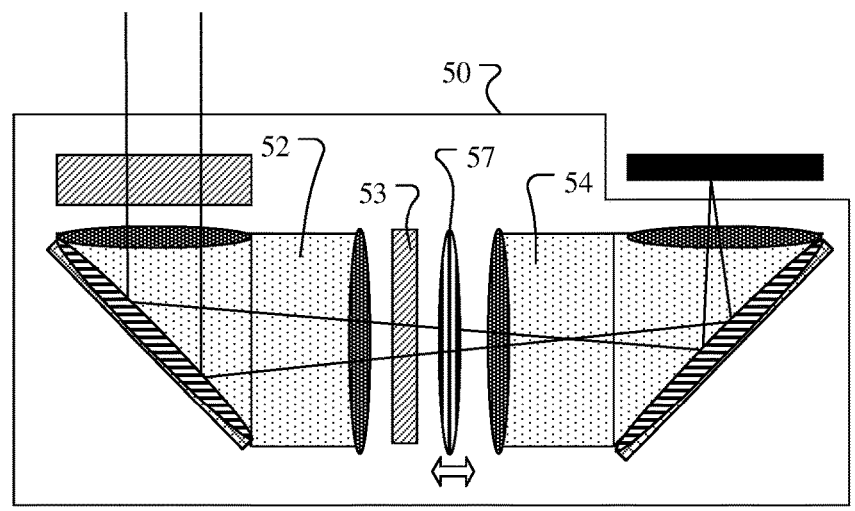
FIG. 13 is a schematic structural diagram of a zoom assembly provided in a ninth implementation of this application.

Referring to FIG. 13, FIG. 13 is a schematic structural diagram of a zoom assembly provided in a ninth implementation of this application. A difference between the zoom assembly 50 provided in the ninth implementation and the zoom assembly 30 provided in the first implementation lies in that the zoom assembly 50 further includes a mobile lens apparatus 57, and the mobile lens apparatus 57 is located between the first lens apparatus 53 and the second transparent component 54. Zooming may be implemented by changing a position of the mobile lens apparatus 57 in an optical path, thereby further improving zoom performance of the zoom assembly 50. In this implementation, the mobile lens apparatus 57 may move along an optical axis of the first lens apparatus 53, to implement zooming of the zoom assembly 50. It can be understood that the mobile lens apparatus 57 may include only one lens, or may be a lens group including a plurality of lenses, or the mobile lens apparatus 57 may include a plurality of lens groups.

In this implementation, the mobile lens apparatus 57 is driven to move by an adjustment unit, to adjust a position thereof in the optical path. The adjustment unit is a voice coil motor (VCM), and a main principle is that, in a permanent magnetic field, a magnitude of a direct current in a coil in the voice coil motor is changed to control a stretch length of an elastic component, to adjust a position of the mobile lens apparatus 57. The zoom assembly so may perform focus adjustment in two manners: adjusting a position of the mobile lens apparatus 57 and a curvature of the focus adjustment lens. To be specific, zoom functions of the two technologies are combined in limited space, so that a focus adjustment limit of a device can be maximized, and imaging quality can be ensured. In a volume similar to that of a conventional VCM camera module, the zoom assembly 50 provided in this implementation can obtain a larger zoom ratio.

It can be understood that the mobile lens apparatus 57 may also be located between the first lens apparatus 53 and the first transparent component 52, and the mobile lens apparatus 57 may move along an optical axis of the first lens apparatus 53, to change a position of the mobile lens apparatus 57 in an optical path.

Tenth Implementation

Figure 14:
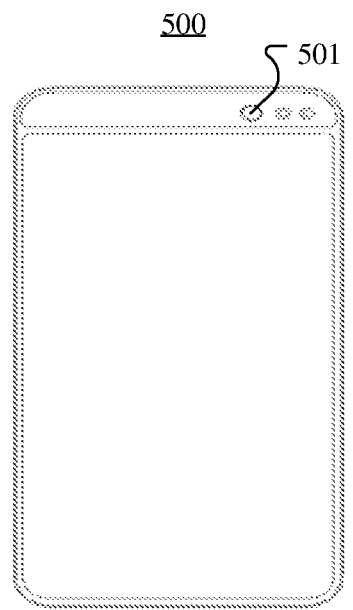
FIG. 14 is a schematic diagram of an electronic device provided in a tenth implementation of this application.
Figure 15:
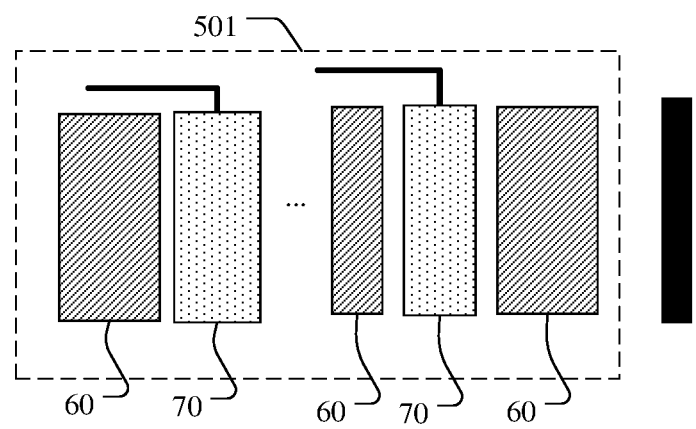
FIG. 15 is a schematic structural diagram of a lens module provided in the tenth implementation of this application.

Referring to FIG. 14, FIG. 14 is a schematic diagram of an electronic device provided in a tenth implementation of this application. The electronic device 500 includes a lens module 501. The lens module 501 is applied to a front lens of the electronic device 500. Referring to FIG. 15, FIG. 15 is a schematic structural diagram of a lens module provided in the tenth implementation. The lens module 501 includes a first zoom assembly 60 and a second zoom assembly 70.

The first zoom assembly 60 and the second zoom assembly 70 are used in cooperation with each other, and the lens module 501 includes a long-focus mode and a near-focus mode. When the lens module 501 is in the long-focus mode, the image size is relatively small, which is convenient for a user to take a large-head selfie, for example, during a video chat. When the lens module 501 is in the near-focus mode, the image size is relatively large, which is convenient for a user to take a selfie with a wide-angle and a large image size when the user is traveling.

The electronic device 500 satisfies both a video chat function and a wide-angle selfie function by using a lens module 501 without sacrificing image quality, thereby ensuring a high screen-to-body ratio of the electronic device 500 and having excellent zoom performance.

Eleventh Implementation

Figure 16:
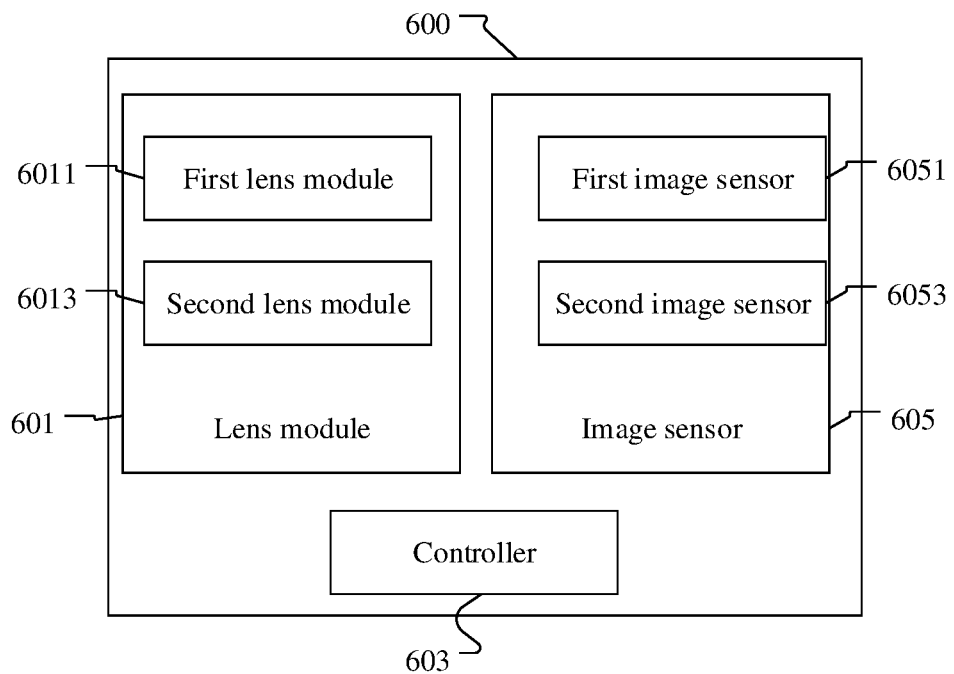
FIG. 16 is a structural block diagram of an electronic device provided in an eleventh implementation of this application.

Referring to FIG. 16, FIG. 16 is a structural block diagram of an electronic device provided in an eleventh implementation of this application. The electronic device 600 includes a lens module 601, a controller 603, and an image sensor 605.

Figure 17:
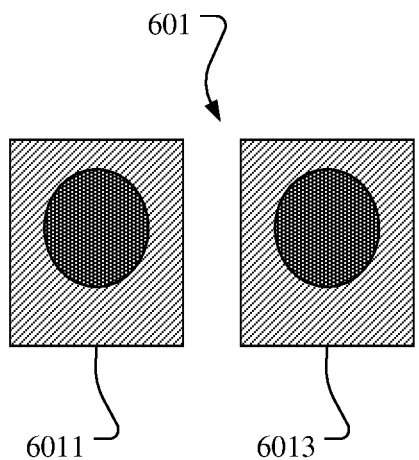
FIG. 17 is a schematic diagram of a lens module provided in the eleventh implementation of this application.

Referring to FIG. 17, FIG. 17 is a schematic diagram of a lens module provided in the eleventh implementation of this application. There are two lens modules 601, and the two lens modules 601 include a first lens module 6011 and a second lens module 6013. The first lens module 6011 and the second lens module 6013 are disposed on a same side of the electronic device.

The first lens module 6011 includes a first zoom range, and the second lens module 6013 includes a second zoom range. The image sensor 605 includes a first image sensor 6015 and a second image sensor 6017, where the first image sensor 6015 is configured to receive light from the first lens module 6011 and generate a first image, the second image sensor 6017 is configured to receive light from the second lens module 6013 and generate a second image, and the controller 603 is configured to fuse the first image and the second image to generate a corrected image, to perform imaging correction, to improve image quality.

A lens module whose focal length is adjusted only by the MEMS technology is defined as an MEMS lens, a lens module whose focal length is adjusted only by the VCM technology is defined as a VCM lens, and a lens module whose focal length is adjusted by the MEMS and VCM technologies is defined as an MEMS+VCM lens.

In this implementation, the first lens module 6011 is an MEMS lens, and the first zoom range is a 1-2× zoom range. The second lens module 6013 is an MEMS+VCM lens, and the second zoom range is a 2-5× zoom range. The lens module 301 includes a long-focus mode and a wide-angle mode. When the lens module 601 is in the long-focus mode, because aberration distortion of a central part of the first lens module 6011 is extremely small, the first image sensor 6015 obtains a first image by using the first lens module 6011, the second image sensor 6017 obtains a second image by using the second lens module 6013, and the controller 603 corrects the second image by using the first image to obtain a corrected image. When the lens module 301 is in the wide-angle mode, the first image sensor obtains a first image by using the first lens module 6011, the second image sensor obtains a second image by using the second lens module 6013, and the controller 603 corrects the first image by using the second image to obtain a corrected image.

In an implementation, the first lens module 6011 is a fixed-focus lens, and the second lens module 6013 is an MEMS+VCM lens.

In an implementation, the first lens module 6011 is a fixed-focus lens, and the second lens module 6013 is an MEMS lens.

In an implementation, the first lens module 6011 is an MEMS lens, and the second lens module 6013 is an MEMS lens.

It can be understood that there may be a plurality of lens modules 601. For example, the lens module 601 includes a first lens module, a second lens module, and a third lens module. The image sensor includes a first image sensor, a second image sensor, and a corrected image sensor. A first zoom range of the first lens module is 0.5-1.5× zoom, a second zoom range of the second lens module is 2-6× zoom, and a third zoom range of the third lens module is 10-30× zoom. The first image sensor obtains a first image by using the first lens module. The second image sensor obtains a second image by using the second lens module. The third image sensor obtains a third image by using the third lens module. The controller corrects the first image by using the second image and the third image to generate a corrected image.

It can be understood that respective zoom ranges of the plurality of lens modules 601 may be partially the same. For example, the first zoom range of the first lens module is 0.5-1.5× zoom, the second zoom range of the second lens module is 2-6× zoom, and the third zoom range of the third lens module is 5-30× zoom.

Figure 18:
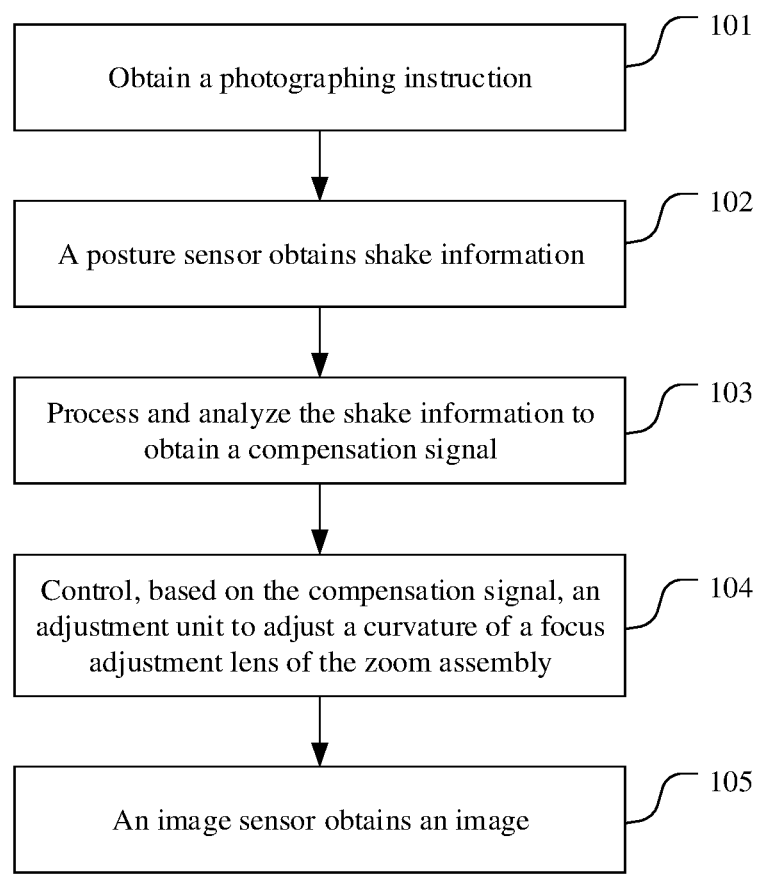
FIG. 18 is a flowchart of a photographing method of an electronic device provided in an implementation of this application.

Referring to FIG. 18, FIG. 18 is a flowchart of a photographing method of an electronic device provided in an implementation of this application. A lens module of the electronic device includes the foregoing zoom assembly, and the photographing method includes the following steps:

Step 101: Obtain a photographing instruction.

Step 102: A posture sensor obtains shake information. In this implementation, the shake information of the electronic device obtained by the posture sensor includes posture and acceleration information.

Step 103: Process and analyze the shake information to obtain a compensation signal.

Step 104: Control, based on the compensation signal, an adjustment unit to adjust a curvature of a focus adjustment lens of the zoom assembly.

Step 105: An image sensor obtains an image.

In this implementation, the focus adjustment lens is a press-type focus adjustment lens, and the press-type focus adjustment lens includes a plurality of pressing areas. The controlling, based on the compensation signal, an adjustment unit to adjust a curvature of a focus adjustment lens of the zoom assembly includes: controlling, based on the compensation signal, the adjustment unit to press a pressing area of the focus adjustment lens, so that the focus adjustment lens is deformed to form an asymmetric curved surface structure, thereby adjusting the curvature of the focus adjustment lens. The adjustment unit is controlled to apply acting forces to the plurality of pressing areas of the focus adjustment lens, so that the focus adjustment lens forms an asymmetric curved surface structure, and then coordinate positions of imaging points of the image sensor are adjusted, imaging distortion is compensated, and an image stabilization function is implemented.

It can be understood that there may be one, two, three, four or more pressing areas. The pressing area(s) is(are) pressed to deform the press-type focus adjustment lens to form an asymmetric curved surface structure.

It can be understood that a quantity of focus adjustment lenses in the zoom assembly adjusted by the adjustment unit is not limited, so that the focal length of the zoom assembly can be adjusted.

It can be understood that the focus adjustment lens is not limited to a press-type focus adjustment lens, and the focus adjustment lens may be another type of lens with adjustable curvature. For example, the focus adjustment lens may be made of a transparent piezoelectric material, and the adjustment unit is a transparent electrode electrically connected to the focus adjustment lens. A voltage is applied by the transparent electrode, so that the piezoelectric material in the focus adjustment lens is deformed under a piezoelectric effect, to cause a change in a curvature radius of the focus adjustment lens, that is, the curvature of the focus adjustment lens of the zoom assembly can be adjusted by controlling the adjustment unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A zoom assembly, comprising:
a first refraction prism comprising a first surface, a second surface, a third surface, and a first mirror, wherein the first surface, the second surface, and the third surface of the first refraction prism are transmission surfaces of the first refraction prism, and the first mirror is attached to the third surface, and the first mirror is configured to receive light transmitted by one of the transmission surfaces of the first refraction prism and reflect the light to another of the transmission surfaces of the first refraction prism; and
a first lens, wherein an optical axis of the first lens is perpendicular to the second surface of the first refraction prism; and
wherein the first refraction prism meets one or more of the following conditions:
the first surface is attached to a focus adjustment lens, the second surface is attached to the focus adjustment lens, or the first mirror comprises the focus adjustment lens and a reflection layer attached to a side of the focus adjustment lens that faces away from the third surface.

2. The zoom assembly according to claim 1, further comprising a first transparent component, wherein the first transparent component is attached to the second surface of the first refraction prism, the first transparent component is located between the first refraction prism and the first lens, and a surface of a side of the first transparent component that faces away from the first refraction prism is attached to the focus adjustment lens.

3. The zoom assembly according to claim 2, further comprising a second transparent component, wherein the first lens is located between the first transparent component and the second transparent component, and a surface of a side of the second transparent component that is adjacent to the first lens is attached to the focus adjustment lens.

4. The zoom assembly according to claim 3, wherein a surface of a side of the second transparent component that faces away from the first lens is attached to the focus adjustment lens.

5. The zoom assembly according to claim 1, further comprising a second refraction prism, wherein the first lens is located between the first refraction prism and the second refraction prism; and
wherein the second refraction prism comprises a first surface, a second surface, a third surface, and a second mirror, wherein the first surface, the second surface, and the third surface of the second refraction prism are transmission surfaces of the second refraction prism, the optical axis of the first lens is perpendicular to the second surface of the second refraction prism, and the second mirror is attached to the third surface of the second refraction prism, and is configured to receive light transmitted by one of the transmission surfaces of the second refraction prism and reflect the light to another transmission surface of the second refraction prism.

6. The zoom assembly according to claim 5, wherein the first surface of the second refraction prism is attached to the focus adjustment lens.

7. The zoom assembly according to claim 5, wherein the second mirror comprises the focus adjustment lens and a reflection layer attached to a side of the focus adjustment lens that faces away from the third surface of the second refraction prism.

8. The zoom assembly according to claim 1, further comprising a mobile lens apparatus, wherein the mobile lens apparatus is located on a side of the first lens that faces away from the second surface of the first refraction prism, and the mobile lens apparatus is configured to move along the optical axis of the first lens.

9. The zoom assembly according to claim 8, wherein the mobile lens apparatus comprises the focus adjustment lens.

10. The zoom assembly according to claim 1, wherein the zoom assembly further comprises a mobile lens apparatus, the mobile lens apparatus is located between the first lens and the second surface of the first refraction prism, and the mobile lens apparatus is configured to move along the optical axis of the first lens.

11. The zoom assembly according to claim 1, wherein the focus adjustment lens comprises a pressing area, and the pressing area is configured to cause deformation of the focus adjustment lens in response to being pressed.

12. A electronic device, comprising:
a zoom assembly, comprising:
a first lens; and
a first refraction prism, comprising a first surface, a second surface, a third surface, and a first mirror, wherein the first surface, the second surface, and the third surface of the first refraction prism are transmission surfaces of the first refraction prism, an optical axis of the first lens is perpendicular to the second surface of the first refraction prism and the first mirror is attached to the third surface of the first refraction prism, and the first mirror is configured to receive light transmitted by one of the transmission surfaces of the first refraction prism and reflect the light to another transmission surface of the first refraction prism; and
a fixed-focus lens assembly; and
wherein the first refraction prism meets one or more of the following conditions:
the first surface of the first refraction prism is attached to a focus adjustment lens, the second surface is attached to the focus adjustment lens, or the first mirror comprises the focus adjustment lens and a reflection layer attached to a side of the focus adjustment lens that faces away from the third surface; and
wherein:
the zoom assembly is configured to receive light from the fixed-focus lens assembly, and adjust a transmission direction of the received light by changing a focal length of the zoom assembly; or
the zoom assembly is configured to adjust a transmission direction of the received light by changing a focal length of the zoom assembly, and transmit the adjusted light to the fixed-focus lens assembly.

13. The electronic device according to claim 12, further comprising another zoom assembly that has a same structure as the zoom assembly.

14. The electronic device according to claim 12, further comprising:
a controller; and
an adjustment unit, wherein the adjustment unit is a micro electro mechanical system (MEMS) or an electrode; and wherein the controller is electrically connected to the adjustment unit, and the adjustment unit is connected to the focus adjustment lens, and wherein the controller is configured to control the adjustment unit to adjust a curvature of the focus adjustment lens, to implement zooming of the zoom assembly.

15. The electronic device according to claim 14, further comprising:
- an image sensor, wherein the zoom assembly is configured to receive light from a photographed object, and the image sensor is configured to receive light from the first lens and generate an image.

16. The electronic device according to claim 15, further comprising:
- a posture sensor, configured to obtain shake information of the electronic device; and
- wherein the controller is further configured to control, based on the shake information, the adjustment unit to adjust the curvature of the focus adjustment lens.

17. The electronic device according to claim 14, wherein the electronic device is a projector, and wherein the electronic device further comprises an image transmitter electrically connected to the controller, and the zoom assembly is configured to receive light output by the image transmitter.

18. The electronic device according to claim 14, wherein the electronic device is an infrared device, and wherein the electronic device further comprises an infrared receiver electrically connected to the controller, and the infrared receiver is configured to receive infrared light.

19. The electronic device according to claim 12, wherein the zoom assembly further comprises a first transparent component, the first transparent component is attached to a second surface of the first refraction prism, and the first transparent component is located between the first refraction prism and the first lens; and a surface of a side of the first transparent component that faces away from the first refraction prism is attached to the focus adjustment lens.

20. The electronic device according to claim 19, wherein the zoom assembly further comprises a second transparent component, the first lens is located between the first transparent component and the second transparent component; and a surface of a side of the second transparent component that is adjacent to the first lens is attached to the focus adjustment lens.

* * * * *